US010847784B2

(12) United States Patent
Iwatani et al.

(10) Patent No.: US 10,847,784 B2
(45) Date of Patent: Nov. 24, 2020

(54) NEGATIVE ELECTRODE ACTIVE MATERIAL FOR LITHIUM ION SECONDARY BATTERY AND METHOD FOR PRODUCING SAME

(71) Applicants: JNC CORPORATION, Tokyo (JP); JNC PETROCHEMICAL CORPORATION, Tokyo (JP)

(72) Inventors: Keizo Iwatani, Chiba (JP); Tetsuro Kizaki, Chiba (JP); Yoshihito Takano, Chiba (JP); Masakazu Kondo, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 176 days.

(21) Appl. No.: 15/742,523

(22) PCT Filed: Jul. 6, 2016

(86) PCT No.: PCT/JP2016/069986
§ 371 (c)(1),
(2) Date: Jan. 8, 2018

(87) PCT Pub. No.: WO2017/010365
PCT Pub. Date: Jan. 19, 2017

(65) Prior Publication Data
US 2018/0212228 A1 Jul. 26, 2018

(30) Foreign Application Priority Data
Jul. 10, 2015 (JP) .................................. 2015-138917

(51) Int. Cl.
*H01M 4/00* (2006.01)
*H01M 4/1391* (2010.01)
(Continued)

(52) U.S. Cl.
CPC ........... *H01M 4/1391* (2013.01); *H01M 2/16* (2013.01); *H01M 4/131* (2013.01); *H01M 4/133* (2013.01);
(Continued)

(58) Field of Classification Search
CPC ...... H01M 4/1391; H01M 4/386; H01M 2/16; H01M 4/133; H01M 4/621; H01M 4/661;
(Continued)

(56) References Cited

U.S. PATENT DOCUMENTS 9,780,367 B2* 10/2017 Kim ..................... H01M 4/386
2008/0166634 A1* 7/2008 Kim ..................... H01M 4/131
429/218.1
(Continued)

FOREIGN PATENT DOCUMENTS

CN 102315445 1/2012
JP H06-325765 11/1994
(Continued)

OTHER PUBLICATIONS

Ferenc Somodi et al., "Vesicular hydrogen silsesquioxane-mediated synthesis of nanocrystalline silicon dispersed in a mesoporous silica/suboxide matrix, with potential for electrochemical applications", New J. Chem., 2015, 39, pp. 621-630.
(Continued)

*Primary Examiner* — Nicholas P D'Aniello
(74) *Attorney, Agent, or Firm* — JCIPRNET

(57) ABSTRACT

A negative electrode active material for the lithium ion secondary battery contains silicon oxide that is obtained by heat-treating, under an inert gas atmosphere, a hydrogen silsesquioxane polymer (HPSQ) obtained by allowing hydrolysis of a silicon compound represented by formula (1) and then a condensation reaction of the resulting material, contains Si, O and H, and has, in an infrared spectrum, a
(Continued)

ratio ($I_1/I_2$) in the range of 0.01 to 0.35 with regard to intensity ($I_1$) of peak 1 at 820 to 920 cm$^{-1}$ due to a Si—H bond to intensity ($I_2$) of peak 2 at 1000 to 1200 cm$^{-1}$ due to a Si—O—Si bond, and is represented by general formula $SiO_xH_y$ (1<x<1.8, 0.01<y<0.4): $HSi(R)_3$ (1), in which R is groups selected from hydrogen, alkoxy having 1 to 10 carbons and the like.

6 Claims, 2 Drawing Sheets

(51) Int. Cl.
| | | |
|---|---|---|
| H01M 4/38 | (2006.01) | |
| H01M 4/131 | (2010.01) | |
| H01M 4/48 | (2010.01) | |
| H01M 2/16 | (2006.01) | |
| H01M 4/133 | (2010.01) | |
| H01M 4/62 | (2006.01) | |
| H01M 4/66 | (2006.01) | |
| C01B 33/18 | (2006.01) | |
| H01M 10/0525 | (2010.01) | |
| H01M 4/02 | (2006.01) | |

(52) U.S. Cl.
CPC ............ *H01M 4/386* (2013.01); *H01M 4/48* (2013.01); *H01M 4/621* (2013.01); *H01M 4/661* (2013.01); *C01B 33/18* (2013.01); *H01M 10/0525* (2013.01); *H01M 2004/027* (2013.01); *H01M 2004/028* (2013.01)

(58) Field of Classification Search
CPC .... H01M 4/131; H01M 4/48; H01M 10/0525; H01M 2004/027; H01M 2004/028; H01M 4/485; C01B 33/18; C01B 33/12; C01P 2002/82

See application file for complete search history.

(56) References Cited

U.S. PATENT DOCUMENTS

| | | | | |
|---|---|---|---|---|
| 2019/0363352 A1* | 11/2019 | Takano | ............ | H01M 10/0525 |
| 2019/0363353 A1* | 11/2019 | Yamada | ............ | H01M 10/0525 |
| 2019/0363354 A1* | 11/2019 | Takano | ................ | H01M 4/604 |

FOREIGN PATENT DOCUMENTS

| | | |
|---|---|---|
| JP | 2007-213825 | 8/2007 |
| JP | 2008-171813 | 7/2008 |
| JP | 2016-031868 | 3/2016 |
| WO | 2004081084 | 9/2004 |
| WO | 2014002602 | 1/2014 |

OTHER PUBLICATIONS

"International Search Report (Form PCT/ISA/210) of PCT/JP2016/069986", with English translation thereof, dated Oct. 11, 2016, pp. 1-3.

"Office Action of Taiwan Counterpart Application," with English translation thereof, dated Nov. 21, 2019, p. 1-p. 17.

Office Action of China Counterpart Application, with English translation thereof, dated Jun. 11, 2020, pp. 1-13.

* cited by examiner

NEGATIVE ELECTRODE ACTIVE MATERIAL FOR LITHIUM ION SECONDARY BATTERY AND METHOD FOR PRODUCING SAME

CROSS-REFERENCE TO RELATED APPLICATION

This application is a 371 application of the international PCT application serial no. PCT/JP2016/069986, filed on Jul. 6, 2016, which claims the priority benefit of Japan application no. 2015-138917, filed on Jul. 10, 2015. The entirety of each of the abovementioned patent applications is hereby incorporated by reference herein and made a part of this specification.

TECHNICAL FIELD

The invention relates to a negative electrode active material for a lithium ion secondary battery, the negative electrode active material having a high capacity to exhibit excellent charging and discharging performance and cycle performance upon being used as the negative electrode active material for the lithium ion secondary battery, and a method for producing the same.

More specifically, the invention relates to a negative electrode active material for a lithium ion secondary battery, containing silicon oxide that is obtained by heat-treating, under an inert gas atmosphere, a hydrogen silsesquioxane polymer (HPSQ) obtained by allowing hydrolysis of a specific silicon compound and then a condensation reaction of the resulting material, contains silicon (Si), oxygen (O) and hydrogen (H), and has, in a spectrum measured by infrared spectroscopy, a ratio ($I_1/I_2$) in the range of 0.01 to 0.35 with regard to intensity ($I_1$) of peak 1 at 820 to 920 cm$^{-1}$ due to a Si—H bond to intensity ($I_2$) of peak 2 at 1000 to 1200 cm$^{-1}$ due to a Si—O—Si bond, and is represented by general formula $SiO_xH_y$ ($1<x<1.8$, $0.01<y<0.4$), and a method for producing the same.

BACKGROUND ART

Various portable devices have been recently widely used in association with rapid advance of electronic devices, communication devices and the like and development of size reduction technologies. Then, as a power supply of the above portable devices, development of a secondary battery that has a high capacity and excellent service-life performance is strongly desired from a viewpoint of economic efficiency, size reduction and weight reduction of the device.

As such a small-sized, lightweight and high capacity secondary battery, development currently progresses on a rocking chair type lithium ion battery in which a lithium intercalation compound that emits a lithium ion from an interlayer is used in a positive electrode material, and a carbonaceous material typified by graphite and the like that can absorb and release (intercalate) the lithium ion into or from the interlayer between crystal planes during charge and discharge is used in a negative electrode material, and the lithium ion battery has brought into practical use and generally used.

A nonaqueous electrolyte secondary battery in which a lithium compound is used as a negative electrode has a high voltage and high energy density, and among the above compounds, lithium metal has been applied as many research objects as a negative electrode active material by a rich battery capacity in an early stage. However, when the lithium metal is used as the negative electrode, a large amount of dendritic lithium precipitates on a surface of negative electrode lithium during charge, and therefore charging and discharging efficiency is reduced, or the dendritic lithium grows to cause short circuit with a positive electrode in several cases, or the lithium metal is sensitive to heat or shock by instability of lithium itself, more specifically, high reactivity thereof. Accordingly, a problem has remained in commercialization thereof.

Then, as the negative electrode active material in place of such lithium metal, a carbon-based negative electrode that intercalates and deintercalates lithium has come to be used.

In the carbon-based negative electrode, various problems of the lithium metal have been solved, and the negative electrode has significantly contributed to wide use of the lithium ion battery. However, accordingly as size reduction, weight reduction and high performance of various portable devices are gradually achieved, achievement of the high capacity of a lithium ion secondary battery has emerged as an important issue.

The lithium ion secondary battery in which the carbon-based negative electrode is used essentially has a low battery capacity. For example, even in a case of graphite having the highest crystallinity as carbon used, a theoretical capacity is about 372 mAh/g in a composition of $LiC_6$. The value is only about 10% in comparison with 3860 mAh/g as the theoretical capacity of the lithium metal. Then, irrespective of the existing problem of a metal negative electrode, research has been actively attempted again on improving a battery capacity by introducing metal such as lithium into the negative electrode.

As typical research, study has been conducted on use of a material containing, as a main component, metal that can be alloyed with lithium, such as Si, Sn and Al, as the negative electrode active material. However, the material that can be alloyed with lithium, such as Si and Sn, has problems of producing fine powder of metal material particles with involving volume expansion during an alloying reaction with lithium, and therefore causing reduction of contact among the metal material particles to produce an active material electrically isolated therefrom within the electrode, or causing elimination of the metal material particles from the electrode to increase internal resistance or reduce the capacity, resulting in reducing cycle performance, or causing severity of an electrolyte decomposition reaction by specific surface area increase, and the like.

In order to solve the problem by use of such a metal material, study has also advanced on using, as a material of the negative electrode active material, metal oxide having a relatively lower coefficient of volume expansion in comparison with the metal.

For example, Patent literature No. 1 discloses that silicon oxide is used as a negative electrode active material of a lithium ion secondary battery to obtain an electrode having a high capacity.

Moreover, Patent literature No. 2 proposes a method in which a calcined product of hydrogen silsesquioxane is used as a silicon oxide-based negative electrode active material that contains amorphous silicon oxide including a nano pore structure. Further, Patent literature No. 3 describes a method in which a silicon compound subjected to hydrogen reduction by exposing silicon oxide to hydrogen plasma is used as a negative electrode active material.

Furthermore, Non-patent literature No. 1 discloses that silicon oxide obtained by preparing hydrogen silsesquioxane gel in the presence of a triblock copolymer and then thermally decomposing the hydrogen silsesquioxane gel is used as a negative electrode active material.

However, while all of publicly-known technologies in which the silicon oxide-based compound is used are recognized to have a predetermined degree of improvement in an initial capacity, charge and discharge are repeated to gradually cause reduction of a reversibly available capacity, and cycle performance that can withstand practical use are not obtained yet.

Further, the publicly-known technologies are poor in productivity as a production method in order to obtain the negative electrode material, and as a result require a high cost.

CITATION LIST

Patent Literature

Patent literature No. 1: JP H6-325765 A
Patent literature No. 2: JP 2008-171813 A
Patent literature No. 3: JP 2007-213825 A Non-Patent Literature Non-patent literature No. 1: New J. Chem., 39621-630 (2015)

SUMMARY OF INVENTION

Technical Problem

A negative electrode active material for a lithium ion secondary battery is still required to solve such a problem of a conventional negative electrode material and to develop a negative electrode active material, in which a battery obtained has a higher capacity to exhibit excellent charging and discharging performance and cycle performance, and a method for producing the same, being excellent in productivity.

The invention provides a negative electrode active material for a secondary battery, the negative electrode active material having an excellent charging and discharging capacity and good cycle performance in which a capacity retention ratio is improved, responding to the requirements, and a method for producing the same, being excellent in productivity.

The present inventors have diligently continued to conduct study toward solving the problems, and as a result, the present inventors have found a negative electrode active material in which, upon being used as the negative electrode active material for a lithium ion secondary battery, a battery to be obtained has excellent charging and discharging performance and cycle performance in which a capacity retention ratio is improved, and a method for producing the negative electrode active material, being excellent in productivity.

Solution to Problem

A first aspect of the invention is a negative electrode active material for a lithium ion secondary battery, comprising silicon oxide that is obtained by heat-treating, under an inert gas atmosphere, a hydrogen silsesquioxane polymer (HPSQ) obtained by allowing hydrolysis of a silicon compound represented by formula (1) and a condensation reaction of the resulting material, contains silicon (Si), oxygen (O) and hydrogen (H), and has, in a spectrum measured by infrared spectroscopy, a ratio ($I_1/I_2$) in the range of 0.01 to 0.35 with regard to intensity ($I_1$) of peak 1 at 820 to 920 $cm^{-1}$ due to a Si—H bond to intensity ($I_2$) of peak 2 at 1000 to 1200 $cm^{-1}$ due to a Si—O—Si bond, and is represented by general formula $SiO_xH_y$ ($1<x<1.8$, $0.01<y<0.4$).

$HSi(R)_3$ (1)

(wherein, R is groups that are identical with or different from each other, and selected from halogen, hydrogen, substituted or unsubstituted alkoxy having 1 to 10 carbons, substituted or unsubstituted aryloxy having 6 to 20 carbons, and substituted or unsubstituted arylalkoxy having 7 to 30 carbons, in which, in the substituted or unsubstituted alkoxy having 1 to 10 carbons, the substituted or unsubstituted aryloxy having 6 to 20 carbons, and the substituted or unsubstituted arylalkoxy having 7 to 30 carbons, arbitrary hydrogen may be replaced by halogen).

A second aspect of the invention is the negative electrode active material for the lithium ion secondary battery according to the first aspect of the invention, wherein the silicon compound is trihalogenated silane or trialkoxysilane.

A third aspect of the invention is the negative electrode active material for the lithium ion secondary battery according to the first aspect or the second aspect of the invention, wherein a temperature upon heat-treating the hydrogen silsesquioxane polymer (HPSQ) under the inert gas atmosphere is 600° C. to 900° C.

A fourth aspect of the invention is the negative electrode active material for the lithium ion secondary battery according to the first aspect or the second aspect of the invention, wherein a temperature upon heat-treating the hydrogen silsesquioxane polymer (HPSQ) under the inert gas atmosphere is 650° C. to 850° C.

A fifth aspect of the invention is a method for producing a negative electrode active material for a lithium ion secondary battery, wherein the negative electrode active material comprises silicon oxide that is obtained by heat-treating, under an inert gas atmosphere, a hydrogen silsesquioxane polymer (HPSQ) obtained by allowing hydrolysis of a silicon compound represented by formula (1), and a condensation reaction of the resulting material, contains silicon (Si), oxygen (O) and hydrogen (H), has, in a spectrum measured by infrared spectroscopy, a ratio ($I_1/I_2$) in the range of 0.01 to 0.35 with regard to intensity ($I_1$) of peak 1 at 820 to 920 $cm^{-1}$ due to a Si—H bond to intensity ($I_2$) of peak 2 at 1000 to 1200 $cm^{-1}$ due to a Si—O—Si bond, and is represented by general formula $SiO_xH_y$ ($1<x<1.8$, $0.01<y<0.4$).

$HSi(R)_3$ (1)

(wherein, R is groups that are identical with or different from each other, and selected from halogen, hydrogen, substituted or unsubstituted alkoxy having 1 to 10 carbons, substituted or unsubstituted aryloxy having 6 to 20 carbons, and substituted or unsubstituted arylalkoxy having 7 to 30 carbons, in which, in the substituted or unsubstituted alkoxy having 1 to 10 carbons, the substituted or unsubstituted aryloxy having 6 to 20 carbons, and the substituted or unsubstituted arylalkoxy having 7 to 30 carbons, arbitrary hydrogen may be replaced by halogen).

A sixth aspect of the invention is a method for producing the negative electrode active material for the lithium ion secondary battery according to the fifth aspect of the invention, wherein the silicon compound is trihalogenated silane or trialkoxysilane.

A seventh aspect of the invention is the method for producing the negative electrode active material for the lithium ion secondary battery according to the fifth aspect or the sixth aspect of the invention, wherein a temperature upon heat-treating the hydrogen silsesquioxane polymer (HPSQ) under the inert gas atmosphere is 600° C. to 900° C.

An eighth aspect of the invention is the method for producing the negative electrode active material for the lithium ion secondary battery according to the fifth aspect or the sixth aspect of the invention, wherein a temperature upon heat-treating the hydrogen silsesquioxane polymer (HPSQ) under the inert gas atmosphere is 650° C. to 850° C.

Advantageous Effects of Invention

According to the invention, a negative electrode active material containing silicon oxide having a new structure, to be directly obtained from a calcined product obtained by heat-treating a hydrogen silsesquioxane polymer (HPSQ) under an inert gas atmosphere can be provided at a low cost.

Moreover, a lithium ion secondary battery obtained by using the negative electrode active material for the lithium ion secondary battery according to the invention has an excellent charging and discharging capacity and cycle performance in which a capacity retention ratio is improved.

DESCRIPTION OF EMBODIMENTS

Figure 1:
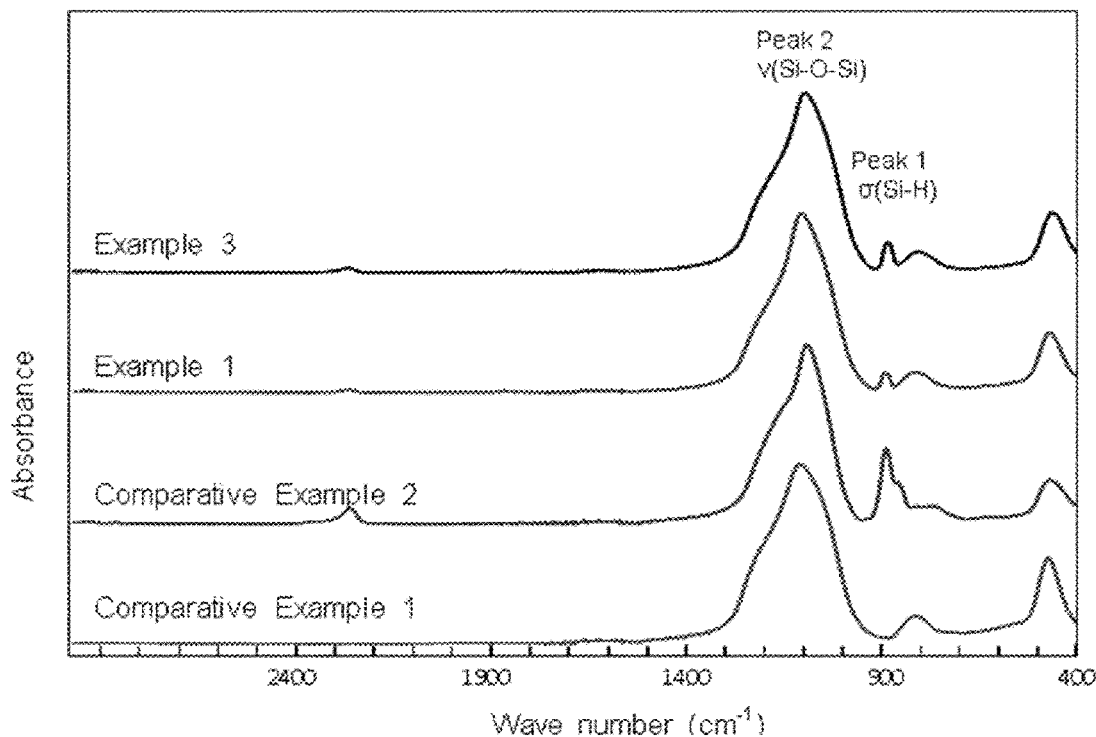
FIG. 1 is a diagram showing an IR absorption spectrum of silicon oxide produced in Examples and Comparative Examples, by infrared spectroscopy (IR).

Hereinafter, the invention will be described in more detail. Production of a Hydrogen Silsesguioxane Polymer (HPSQ)

A hydrogen silsesquioxane polymer (HPSQ) according to the invention is obtained by allowing hydrolysis of a silicon compound represented by formula (1) and a condensation reaction of the resulting material.

$$\text{HSi(R)}_3 \quad (1)$$

In formula (1), R is groups that are identical with or different from each other, and selected from halogen, hydrogen, substituted or unsubstituted alkoxy having 1 to 10 carbons, substituted or unsubstituted aryloxy having 6 to 20 carbons, and substituted or unsubstituted arylalkoxy having 7 to 30 carbons, in which, in the substituted or unsubstituted alkoxy having 1 to 10 carbons, the substituted or unsubstituted aryloxy having 6 to 20 carbons, and the substituted or unsubstituted arylalkoxy having 7 to 30 carbons, arbitrary hydrogen may be replaced by halogen.

Specific examples of the silicon compound represented by formula (1) include compounds described below. Examples include trihalogenated silane or dihalogenated silane, such as trichlorosilane, trifluorosilane, tribromosilane and dichlorosilane; trialkoxysilane or dialkoxysilane, such as tri-n-butoxysilane, tri-t-butoxysilane, tri-n-propoxysilane, tri-i-propoxysilane, di-n-butoxyethoxysilane, triethoxysilane, trimethoxysilane, diethoxysilane; and further aryloxysilane or aryloxyalkoxysilane, such as triaryloxysilane, diaryloxysilane and diaryloxyethoxysilane.

Among the above compounds, from viewpoints of ease of a reaction and availability, and a production cost, trihalogenated silane or trialkoxysilane is preferred, and trihalogenated silane is particularly preferred.

The silicon compounds represented by formula (1) may be used alone, or two or more kinds may be mixed and used.

In the silicon compound represented by formula (1) according to the invention, hydrolyzability and condensation reactivity are high, and not only the hydrogen silsesquioxane polymer (HPSQ) is easily obtained, but also a Si—H bonding amount of silicon oxide obtained upon being heat-treated under an inert gas atmosphere is easily controlled.

Then, the hydrogen silsesquioxane polymer (HPSQ) according to the invention is obtained by allowing hydrolysis of the silicon compound represented by formula (1) according to the invention and the condensation reaction of the resulting material.

The hydrolysis can be carried out by a publicly-known method, for example, in a solvent such as alcohol or DMF, in the presence of inorganic acid such as hydrochloric acid or organic acid such as acetic acid and water, at an ordinary temperature or under heating. Accordingly, in addition to a hydrolyzate of the silicon compound represented by formula (1) according to the invention, a solvent, acid and water, and a material derived therefrom may be contained in a reaction mixture after the hydrolysis.

Moreover, in the reaction mixture after the hydrolysis, the silicon compound represented by formula (1) according to the invention need not be completely hydrolyzed, and a part thereof may remain.

On the occasion, in addition to a hydrolysis reaction, a polycondensation reaction of the hydrolyzate also partially progresses.

Here, a degree at which the polycondensation reaction progresses can be controlled by a hydrolysis temperature, a hydrolysis time, acidity and/or a solvent, or the like, and for example, can be appropriately set according to objective silicon oxide as described later.

In the invention, a method in which the hydrolysis and the condensation reaction are carried out in parallel under identical conditions in one reactor is further suitable in consideration of productivity and the production cost thereof.

As reaction conditions, the silicon compound represented by formula (1) according to the invention is added to an acidic aqueous solution under stirring, and is allowed to react at a temperature of −20° C. to 50° C., preferably 0° C. to 40° C., and particularly preferably 10° C. to 30° C., for 0.5 hour to 20 hours, preferably for 1 hour to 10 hours, and particularly preferably for 1 hour to 5 hours.

As the acidity, the solution is ordinarily preferably adjusted to pH 6 or less, and further preferably to pH 3 or less. As the acid used for the pH adjustment, both the organic acid and the inorganic acid can be used.

Specific examples of the organic acid include formic acid, acetic acid, propionic acid, oxalic acid and citric acid, and specific examples of the inorganic acid include hydrochloric acid, sulfuric acid, nitric acid and phosphoric acid, and hydrochloric acid is preferred because the hydrolysis reaction and the subsequent polycondensation reaction can be easily controlled, and availability, the pH adjustment and treatment after the reaction are also easy.

Moreover, when halogenated silane such as trihalogenated silane is used as the silicon compound represented by formula (1) according to the invention, an acidic aqueous solution is formed in the presence of water, and therefore acid need not be particularly added separately, which is one of preferred aspects of the invention.

After completion of the hydrolysis reaction and the polycondensation reaction, a liquid portion is separated and removed by filtration and separation, centrifugal separation or the like, and in several cases, washed with water or the organic solvent and then dried to obtain the hydrogen silsesquioxane polymer (HPSQ).

Silicon Oxide and a Method for Producing the Same

The silicon oxide according to the invention is obtained by heat-treating, under the inert gas atmosphere, the hydrogen silsesquioxane polymer (HPSQ) obtained by the above method according to the invention. "Inert gas" in the invention needs containing no oxygen, but formation of silicon dioxide only need be suppressed to such an extent in which an advantageous effect of the invention is not adversely affected (more specifically, a value of $I_1/I_2$ only need be controlled within a numerical range specified in the invention) upon heat-treating HPSQ. Accordingly, oxygen only need be removed from "inert gas" so as to achieve the objective. The silicon oxide thus obtained, when a composition thereof is measured by an elemental analysis, contains silicon (Si), oxygen (O) and hydrogen (H), and is represented by general formula $SiO_xH_y$, ($1<x<1.8$, $0.01<y<0.4$).

If x is in the range: $1<x<1.8$, preferably $1.2<x<1.8$, and further preferably $1.3<x<1.7$, the silicon oxide is easily produced and a sufficient battery capacity can be obtained. If y is in the range: $0.01<y<0.4$, and preferably $0.1<y<0.3$, a secondary battery obtained has an excellent charging and discharging capacity and good cycle performance in which a capacity retention ratio is improved.

Further, the silicon oxide according to the invention has, in a spectrum measured by infrared spectroscopy (IR), a ratio $(I_1/I_2)$ in the range of 0.01 to 0.35 with regard to intensity $(I_1)$ of peak 1 at 820 to 920 cm$^{-1}$ due to a Si—H bond to intensity $(I_2)$ of peak 2 at 1000 to 1200 cm$^{-1}$ due to a Si—O—Si bond.

If the ratio $(I_1/I_2)$ is in the range of 0.01 to 0.35, preferably 0.01 to 0.30, and further preferably 0.03 to 0.20 with regard to intensity $(I_1)$ of peak 1 to intensity $(I_2)$ of peak 2, when a battery is formed, the good cycle performance and a high charging and discharging capacity can be developed by the presence of a suitable amount of Si—H bonds.

Further, the silicon oxide according to the invention is obtained by heat-treating the hydrogen silsesquioxane polymer (HPSQ) according to the invention as described above under the inert gas atmosphere.

The heat treatment is required to be applied thereto under the inert gas atmosphere as described above in detail. If the heat treatment is applied thereto in an atmosphere where oxygen exists, silicon dioxide is formed. Thus, a desired composition and Si—H bonding amount are unable to be obtained.

Specific examples of the inert gas include nitrogen, argon and helium. The above inert gases can be satisfactorily used if the inert gas is in a high purity specification generally used. Moreover, the heat treatment can also be applied thereto by forming an atmosphere where oxygen is removed by high vacuum without using the inert gas.

The heat treatment is applied thereto under the inert gas atmosphere according to the invention. Thus, in the hydrogen silsesquioxane polymer (HPSQ), dehydrogenation of the Si—H bond starts from the vicinity of 600° C. to form a Si—Si bond. If the Si—Si bond is moderately grown, the Si—Si bond is formed into an excellent Li intercalation site to serve as a source of a high charge capacity. Meanwhile, the Si—H bond interacts with a binder having a functional group such as a COO$^-$ group, being a publicly-known battery material component, to form a flexible and strong bond, and therefore when the battery is formed, the good cycle performance is developed.

Accordingly, a suitable amount of Si—H bonds is required to remain in order to develop both a high capacity and the good cycle performance, and a heat treatment temperature satisfying such conditions is 600° C. to 900° C., preferably 650° C. to 850° C., and further preferably 750° C. to 850° C.

A heat treatment time is not particularly limited, but is ordinarily 30 minutes to 10 hours, and preferably 1 to 8 hours.

The silicon oxide according to the invention is obtained by the heat treatment described above, and heat treatment conditions may be appropriately selected in such a manner that results of the elemental analysis already described fall within the range of $SiO_xH_y$ ($1<x<1.8$, $0.01<y<0.4$), and the ratio $(I_1/I_2)$ falls within the range of 0.01 to 0.35 with regard to intensity $(I_1)$ of peak 1 to intensity $(I_2)$ of peak 2 by the infrared spectroscopy.

Figure 2:
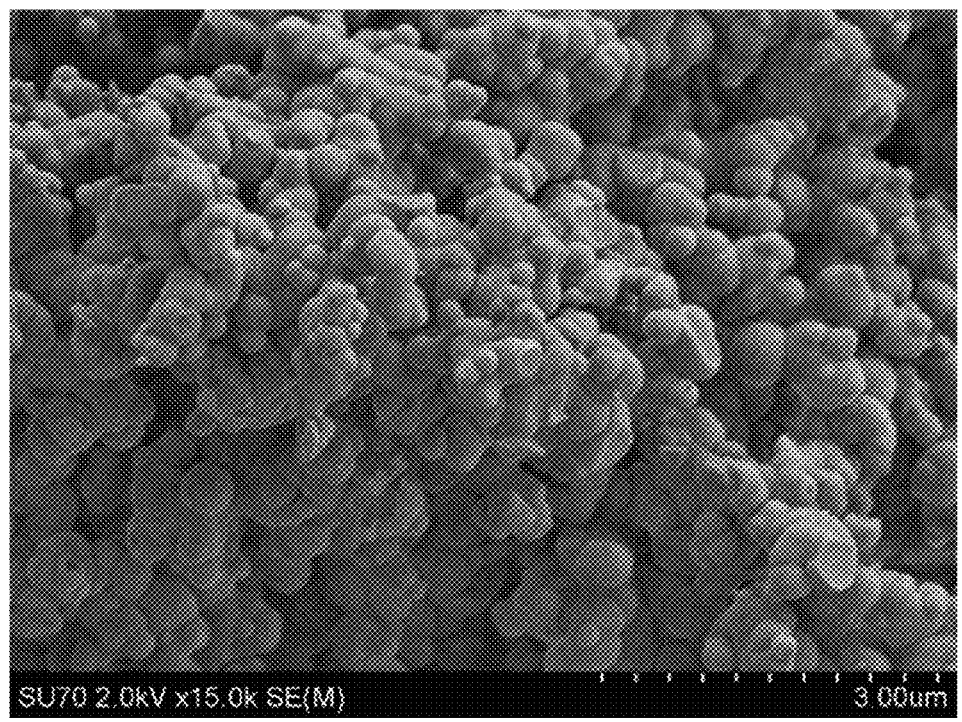
FIG. 2 shows a microscope (SEM) photograph of silicon oxide (1) produced in Example 1.

The silicon oxide thus obtained according to the invention is obtained by heat-treating the hydrogen silsesquioxane polymer (HPSQ) obtained by the synthetic method according to the invention. Thus, as is obvious from a scanning electron microscope (SEM) photograph shown in FIG. 2, primary particles being spherical particles having a particle size of submicron order are further aggregated to form a secondary aggregate having a particle size of several micrometers.

Owing to small primary particles, when the material is used as a negative electrode material of the lithium ion secondary battery, stress during expansion and contraction caused upon repeating charge and discharge as the secondary battery is relaxed, and cycle deterioration is suppressed to be effective in improvement of the cycle performance. Moreover, binding properties with the binder become favorable by having a complicated secondary aggregation structure to develop superb cycle performance.

As described above, in a silicon oxide-based negative electrode active material, as the particle size is smaller, the stress during expansion and contraction can be further relaxed. However, in particles having a specific surface area larger than necessary, for example, having a particle size of a nano size or including a nano pore structure in the particles, a contact area with an electrolyte becomes large, and a film formation reaction amount on surfaces of the negative electrode particles is increased, leading to deterioration of the cycle performance. In the above regard, the silicon oxide according to the invention has a moderate particle size of a submicron size, and a moderate specific surface area of 3 to 8 m$^2$/g. Therefore, an influence of capacity reduction by the film formation reaction with the electrolyte is small, and excellent cycle performance is conceivably obtained.

Figure 3:
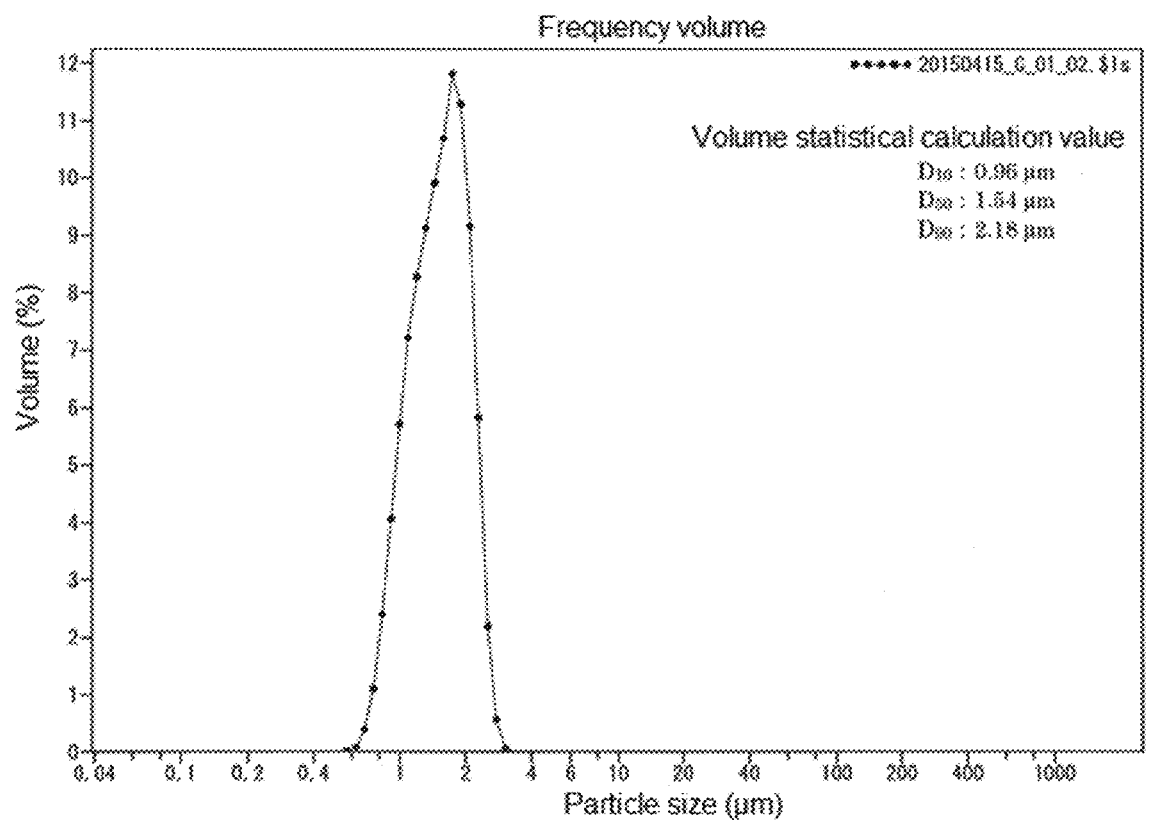
FIG. 3 is a diagram showing a size distribution measurement of silicon oxide (1) produced in Example 1.

Moreover, as shown in FIG. 3, the silicon oxide according to the invention has a feature of a significantly narrow particle size distribution. The narrow particle size distribution causes favorable handling properties during production of the negative electrode, and also can enhance electrode density.

Negative Electrode Active Material Containing Silicon Oxide

The invention provides the negative electrode active material for the lithium ion secondary battery, containing the silicon oxide.

In the battery, charge and discharge of a large amount of current are essential for achieving the high capacity, and therefore a demand is expressed for a material having low electric resistance for an electrode.

Accordingly, complexing of a carbon-based material with the silicon oxide is also one aspect of the invention.

In order to complex the carbon-based material therewith, specific examples therefor include a method for complexing the carbon-based material with the silicon oxide by a mechanical fusion processing method such as mechanofusion or a vapor deposition method such as chemical vapor deposition (CVD), and a method for dispersing the carbon-based material into the silicon oxide by a mechanical mixing method using a ball mill or a vibrating mill.

In addition, in the method for complexing the carbon-based material with the silicon oxide, a carbon-based material precursor may be mixed with the silicon oxide, and heat treatment is applied to the resulting mixture. Thus, a carbon-based material produced by conversion of the carbon-based material precursor can also be complexed with the silicon oxide.

Specific examples of the carbon-based material according to the invention preferably include a carbon-based material such as graphite, carbon black, graphene, fullerene, a carbon nanotube, a carbon nanofoam, pitch-based carbon fibers, polyacrylonitrile-based carbon fibers and amorphous carbon.

Moreover, specific examples of the carbon-based material precursor according to the invention include a carbon-containing organic compound or polymer that can be converted into a carbon-based material by heat treatment.

Specific examples include hydrocarbon gases such as methane, ethylene, propylene and acetylene, saccharides such as sucrose, glucose and cellulose, glycols such as ethylene glycol, diethylene glycol, polyethylene glycol and propylene glycol, a phenolic resin, an epoxy resin, polyvinyl chloride, polyvinyl alcohol, polypyrrole, and further petroleum pitch, coal tar pitch and acetylene black.

In addition, as a complexing proportion of the carbon-based material with the silicon oxide, the carbon-based material is preferably in the range of 5 to 90% by weight based on a total amount of the silicon oxide and the carbon-based material.

Negative Electrode

The negative electrode in the lithium ion secondary battery according to the invention is produced by using the negative electrode active material containing the silicon oxide or the silicon oxide complexed with the carbon-based material.

For example, the negative electrode may be produced by shaping, into a predetermined shape, a negative electrode mixture material containing the negative electrode active material formed by containing the silicon oxide or the silicon oxide complexed with the carbon-based material according to the invention, and the binder, or a method in which the negative electrode mixture material is applied onto a collector such as copper foil. A method for shaping the negative electrode is not particularly limited, and a publicly-known method can be applied thereto.

More specifically, according to an ordinary manner, a negative electrode plate is obtained by preparing a negative electrode material composition including the negative electrode active material containing the silicon oxide or the silicon oxide complexed with the carbon-based material according to the invention, and the binder, and when necessary a conductive material and the like, and directly coating the resulting material on the collector in a rod-like body, a plate-like body, a foil-like body, a net-like body or the like, based essentially on copper, nickel, stainless steel or the like, or separately casing the negative electrode material composition on a support, and laminating a negative electrode active material film peeled from the support on the collector. Moreover, the negative electrode according to the invention is not limited to the forms listed above, and can also be obtained in a form other than the forms listed.

As the binder, any binder can be used if the agent is generally used in the secondary battery, and has a functional group such as a $COO^-$ group that interacts with the Si—H bond on the negative electrode active material, and specific examples thereof include carboxymethylcellulose, polyacrylic acid, alginic acid, glucomannan, amylose, saccharose, and a derivative or a polymer thereof, and further an alkali metal salt thereof, and also a polyimide resin and a polyimideamide resin. The binders may be used alone, or in the form of a mixture thereof. Furthermore, a component providing the agent with another function such as improvement in binding properties with the collector, improvement in dispersibility and improvement in conductivity of the binder itself, for example, a styrene-butadiene rubber-based polymer and a styrene isoprene rubber-based polymer may be added and mixed.

Lithium Ion Secondary Battery

The lithium ion secondary battery using the negative electrode active material containing the silicon oxide according to the invention can be produced as described below.

First, a positive electrode active material that can reversibly intercalate and deintercalate Li, a conductivity agent, a binder and a solvent are mixed to arrange a positive electrode active material composition. In a manner similar to the negative electrode, as is ordinarily carried out, the positive electrode active material composition is directly coated on a metal collector and dried to arrange a positive electrode plate.

A positive electrode can also be prepared by separately casing the positive electrode active material composition on the support, and then laminating the film peeled from the support on the metal collector. A method for shaping the positive electrode is not particularly limited, and a publicly-known method can be applied thereto.

As the positive electrode active material, any material can be used if the material is lithium-containing complex metal oxide, and is generally used in a field of the secondary battery, and specific examples include $LiNi_mCo_nMn_{1-m-n}O_2$ and $LiMn_2O_4$ (where, m and n represent a numerical value of 0 to 1, and an expression: m+n≥1 holds). Specific examples of the complex oxide include $LiMn_2O_4$, $LiCoO_2$, $LiNiO_2$ and $LiFeO_2$. Moreover, $V_2O_5$, TiS, MoS and the like, being a compound that can oxidize and reduce lithium, can also be used.

As the conductivity agent, carbon black, graphite fine particles and the like can be used, and as the binder, a vinylidene fluoride-propylene hexafluoride copolymer, polyvinylidene fluoride (PVDF), polyacrylonitrile, polymethylmethacrylate, polytetrafluoroethylene and a mixture thereof, or a styrene-butadiene rubber-based polymer can be used, and as the solvent, N-methylpyrrolidone, acetone, water and the like can be used.

On the occasion, a content of the positive electrode active material, the conductivity agent, the binder and the solvent is specified to be an amount to be generally used in the lithium ion secondary battery.

As a separator to be interposed between the positive electrode and the negative electrode, any separator can be used if the separator is generally used in the lithium ion secondary battery. A material having low resistance against ion migration of the electrolyte, or excellent electrolyte impregnation ability is particularly preferred. Specific examples include a material selected from glass fibers, polyester, Teflon (registered trademark), polyethylene, polypropylene and polytetrafluoroethylene (PTFE), and the material may be in the form of a nonwoven fabric or a woven fabric.

More specifically, in the case of the lithium ion secondary battery, a windable separator composed of a material such as polyethylene and polypropylene is used, and in the case of a lithium ion polymer battery, a separator having excellent organic electrolyte impregnation ability is used. However, a method for shaping such a separator is not particularly limited, and a publicly-known method can be applied thereto. For example, the separator can be produced by the method described below.

More specifically, the separator can be formed by mixing a polymer resin, a filler and a solvent to arrange a separator composition, and then directly coating the separator composition on an upper part of an electrode, and drying the resulting material to form a separator film, or casting the separator composition on the support and drying the resulting material, and then laminating the separator film peeled from the support on the upper part of the electrode.

The polymer resin is not particularly limited, and any material used in the binder for an electrode plate can be used. For example, a vinylidene fluoride-hexafluoride propylene copolymer, polyvinylidene fluoride, polyacrylonitrile, polymethylmethacrylate and a mixture thereof can be used.

As the electrolyte, such a material can be used, in which one kind of electrolyte or a mixture of two or more kinds of electrolytes formed of a lithium salt such as $LiPF_6$, $LiBF_4$, $LiSb_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)$ $(C_yF_{2y+1}SO_2)$ (where, x and y are natural numbers), LiCl and LiI is dissolved in a solvent such as propylene carbonate, ethylene carbonate, diethylene carbonate, ethyl methyl carbonate, methyl propyl carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethyl carbonate, methyl isopropyl carbonate, ethyl propyl carbonate, dipropyl carbonate, dibutyl carbonate, diethylene glycol or diethyl ether or a mixed solvent thereof.

Moreover, various other nonaqueous electrolytes or solid electrolytes can also be used. For example, various ionic liquids to which a lithium ion is added, a pseudo solid electrolyte in which the ionic liquid and fine powder are mixed, a lithium ion conductive solid electrolyte and the like can be used.

Furthermore, for the purpose of improving the charging and discharging cycle performance, a compound that promotes stable film formation on surfaces of the negative electrode active material can be appropriately incorporated into the electrolyte described above. For example, such fluorinated carbonate is effective as vinylene carbonate (VC), fluorobenzene, cyclic fluorinated carbonate (such as fluoroethylene carbonate (FEC), trifluoropropylene carbonate (TFPC)), or chain fluorinated carbonate (such as trifluorodimethyl carbonate (TFDMC), trifluorodiethyl carbonate (TFDEC) and trifluoroethyl methyl carbonate (TFEMC)). In addition, the cyclic fluorinated carbonate and the chain fluorinated carbonate can also be used as the solvent, such as ethylene carbonate.

The separator is disposed between the positive electrode plate and the negative electrode plate, to form a battery structure. If such a battery structure is wound or folded into a cylindrical battery case or a square battery case, and then the electrolyte is injected thereto, the lithium ion secondary battery is completed.

Moreover, if the battery structures are laminated into a bicelle structure, and the laminate is impregnated into an organic electrolyte, and the material obtained is put into a pouch and sealed, the lithium ion polymer battery is completed.

In comparison with conventional general silicon oxide, the silicon oxide formed by heat-treating the hydrogen silsesquioxane polymer (HPSQ) according to the invention has, as shown in FIG. 1, in a spectrum measured by infrared spectroscopy (IR), a ratio ($I_1/I_2$) in the range of 0.01 to 0.35 with regard to intensity ($I_1$) of peak 1 at 820 to 920 $cm^{-1}$ due to the Si—H bond to intensity ($I_2$) of peak 2 at 1000 to 1200 $cm^{-1}$ due to the Si—O—Si bond, and is represented by general formula $SiO_xH_y$ ($1<x<1.8$, $0.01<y<0.4$), as shown in elemental analysis values in Table 1. Thus, the lithium ion secondary battery produced by using the negative electrode active material formed by containing the silicon oxide can conceivably exhibit the high capacity, and the excellent charging and discharging performance and cycle performance.

EXAMPLES

Hereinafter, the invention will be described more specifically by describing Examples and Comparative Examples, but is not limited by the Examples.

In the present Examples, various analyses and evaluations were conducted on silicon oxide prepared in Examples 1 to 4 and Comparative Examples 1 to 3.

In each Example and Comparative Example, a measuring device and a measuring method for "measurement by infrared spectroscopy" and "measurement by an elemental analysis," and "evaluation of battery performance" are as described below.

(Measurement by Infrared Spectroscopy)

With regard to measurement by infrared spectroscopy, measurement was carried out by using Nicolet iS5 FT-IR made by Thermo Fisher Scientific Inc. as an infrared spectral device, in measurement of transmission by a KBr method (resolution: 4 $cm^{-1}$, the number of scans: 16 times, data interval: 1.928 $cm^{-1}$, detector: DTGS KBr) on intensity ($I_1$) of peak 1 at 820 to 920 $cm^{-1}$ due to a Si—H bond and intensity ($I_2$) of peak 2 at 1000 to 1200 $cm^{-1}$ due to a Si—O—Si bond. In addition, each peak intensity was determined by connecting a starting point and an end point of a target peak by a straight line, partially correcting a baseline, and then measuring a height from the baseline to a peak top.

(Elemental Analysis)

An elementary composition analysis was conducted by a Rutherford back scattering analysis (RBS)-hydrogen forward scattering analysis (HFS) method in which a high-accuracy composition value including hydrogen is obtained by solidifying sample powder into a pellet shape, and then irradiating the sample with a He ion accelerated to 2.3 MeV, and analyzing an energy spectrum of back-scattering particles and an energy spectrum of a forward-scattering hydrogen atom. Measurement was carried out by using a measuring device Pelletron 3SDH made by National Electrostatics Corporation under conditions of incident ion: 2.3 MeV He, incident angle during RBS/HFS simultaneous measurement: 75 degrees, scattering angle: 160 degrees, sample current: 4 nA and beam diameter: 2 mmφ.

(Measurement of Particle Size Distribution)

With regard to measurement of a particle size distribution, measurement was carried out according to laser diffractometry by using Laser Diffraction Particle Size Analyzer (made by Beckman Coulter, Inc., LS-230), and ultrasonically dispersing sample powder into pure water.

(BET Specific Surface Area)

A BET specific surface area was measured by putting 1 g of sample powder into a measuring cell, and then drying the sample powder at 250° C. for 2 hours using a mantle heater while purging with a nitrogen gas, and then cooling the powder to room temperature for 1 hour, and then using Nave 4200e made by Malvern Instruments Ltd.

(Evaluation of Battery Performance)

Charging and discharging performance of a lithium ion secondary battery or the like using a negative electrode active material containing silicon oxide according to the invention were measured as described below.

Constant current charge was carried out on a Li electrode at a current of 100 mA per 1 g of silicon oxide until voltage reached 0.001 V by using BTS 2005W made by NAGANO & Co., Ltd., and then constant voltage charge was carried out while maintaining a voltage of 0.001 V until current reached a current value equal to or less than 20 mA per 1 g of an active material.

After elapse of a resting period of about 30 minutes, constant current discharge was carried out on a completely charged cell at a current of 100 mA per 1 g of an active material until voltage reached 1.5 V.

Moreover, a charging capacity was calculated from an integrated current value until the constant voltage charge finished, and a discharging capacity was calculated from an integrated current value until a battery voltage reached 1.5 V. During switching between each charge and discharge, operation was rested for 30 minutes in an open circuit.

Charging and discharging cycle performance was also measured under similar conditions.

In addition, charging and discharging efficiency was taken as a ratio of a discharging capacity to a charging capacity for the first time (first cycle of charge and discharge), and a capacity retention ratio was taken as a ratio of a discharging capacity for the 100th cycle of charge and discharge to a discharging capacity for the first time.

(Preparation of a Hydrogen Silsesquioxane Polymer (HPSQ))

Synthesis Example 1

Into a 300 mL three-neck flask, 96 g of pure water was charged, and then an atmosphere inside the flask was replaced by nitrogen. Then, 16.0 g (118 mmol) of trichlorosilane was added dropwise thereto at 20° C. under stirring while the mixture in the flask was ice-cooled. After completion of dropwise addition, a hydrolysis reaction and a condensation reaction were carried out at 20° C. for 2 hours while the mixture was stirred.

After elapse of a predetermined reaction time, a reactant was filtered using a membrane filter (pore size: 0.45 micrometer, hydrophilic), and a solid was collected. The solid obtained was dried under reduced pressure at 80° C. for 10 hours to obtain 6.03 g of hydrogen silsesquioxane polymer (1).

Synthesis Example 2

Into a 3 L separable flask, 12.2 g (120 mmol) of hydrochloric acid having a 36 wt % concentration and 1.19 kg of pure water were charged, and 167 g (1.37 mol) of trimethoxysilane (Tokyo Chemical Industry Co., Ltd) was added dropwise thereto at 25° C. under stirring. After completion of dropwise addition, a hydrolysis reaction and a condensation reaction were carried out at 25° for 2 hours while the mixture was stirred.

After elapse of a predetermined reaction time, a reactant was filtered by a membrane filter (pore size: 0.45 micrometer, hydrophilic), and a solid was collected. The solid obtained was dried under reduced pressure at 80° C. for 10 hours to obtain 76.0 g of hydrogen silsesquioxane polymer (2).

Example 1

(Preparation of Silicon Oxide)

On an alumina boat of an SSA-S grade, 20.0 g of hydrogen silsesquioxane polymer (1) obtained in a manner similar to Synthesis Example 1 was placed, and then the boat was set in a vacuum purging tube furnace KTF43N1-VPS (made by Koyo Thermo Systems Co., Ltd.). Then, as heat treatment conditions, while an argon gas was fed at a flow rate of 250 mL per minute under an argon gas atmosphere (high-purity argon gas: 99.999%), and temperature was increased at a rate of 4° C. per minute, and calcination was carried out at 800° C. for 1 hour to obtain silicon oxide.

Then, the silicon oxide obtained was disintegrated and ground with a mortar for 5 minutes, and the resulting material was classified using a stainless steel sieve having an opening of 32 micrometers to obtain 18.9 g of granular silicon oxide (1) having a maximum particle size of 32 micrometers.

The results of infrared spectrometry and an elemental analysis of silicon oxide (1) obtained are shown in FIG. 1 and Table 1, respectively.

(Preparation of a Negative Electrode Body)

To 20 g of an aqueous solution of 2 wt % carboxymethylcellulose, 3.2 g of silicon oxide (1) and 0.4 g of acetylene black were added. The resulting mixture was mixed for 15 minutes using a stirring bar in a flask, and then distilled water was added to be 15% by weight in a solid content concentration, and the resulting mixture was stirred for 15 minutes to prepare a slurry-form composition. The slurry-form composition was transferred to a thin-film spin system high-speed mixer (FILMIX Model 40-40) made by PRIMIX Corporation, and was stirred and dispersed at a revolution speed of 20 meters per second for 30 seconds. The slurry after dispersion treatment was coated on a copper foil roll at a thickness of 200 micrometers by a doctor blade method.

After coating, the coated roll was dried for 90 minutes on a hot plate at 80° C. After drying, a negative electrode sheet was pressed by a 2t small precision roll press (made by THANK-METAL Co., LTD.). After pressing, an electrode was punched by a 14.50 mmφ electrode punch HSNG-EP, and was dried under reduced pressure at 80° C. for 16 hours in a glass tube oven GTO-200 (SIBATA) to prepare a negative electrode body.

(Preparation and Evaluation of a Lithium Ion Secondary Battery)

Figure 4:
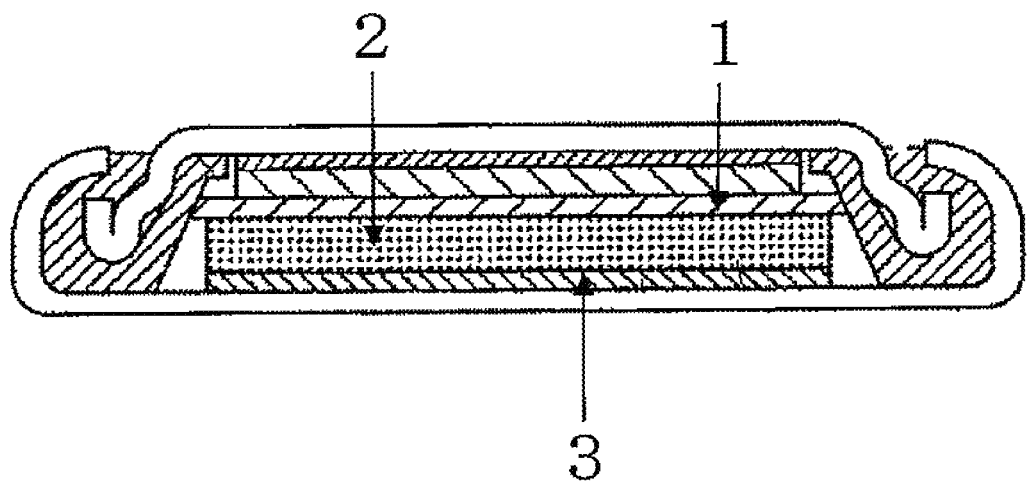
FIG. 4 is a diagram showing a configuration example of a coin type lithium ion secondary battery.

A 2032 type coin battery having a structure shown in FIG. 4 was prepared. The negative electrode body, lithium metal and a microporous polypropylene film were used as negative electrode 1, counter electrode 3 and separator 2, respectively. As an electrolyte, a material was used, in which the material was prepared by adding 5% by weight of fluoroethylene carbonate to a 1:1 (volume ratio) mixed solvent of ethylene carbonate and diethyl carbonate, as prepared by dissolving $LiPF_6$ at a ratio of 1 mol per liter.

Then, battery performance of the lithium ion secondary battery were evaluated by the method described above.

The results are shown in Table 1.

Example 2

Silicon oxide (2) was obtained in a manner similar to Example except that, in preparation of silicon oxide, hydrogen silsesquioxane polymer (2) obtained in Synthesis Example 2 was used in place of hydrogen silsesquioxane polymer (1).

For silicon oxide (2), a negative electrode body was prepared in a manner similar to Example 1, and battery performance of a lithium ion secondary battery were evaluated.

The results of an elemental analysis and battery performance of silicon oxide (2) are shown in Table 1.

Example 3

Silicon oxide (3) was obtained in a manner similar to Example 1 except that, in preparation of silicon oxide, a calcination temperature in heat treatment was adjusted to 700° C.

For silicon oxide (3), a negative electrode body was prepared in a manner similar to Example 1, and battery performance of a lithium ion secondary battery were evaluated.

The results of infrared spectrometry and an elemental analysis of silicon oxide (3) are shown in FIG. 1 and Table 1, respectively.

Example 4

Into 25 g of an aqueous solution of 2 wt % sodium alginate, 4.25 g of silicon oxide (1) obtained in a manner similar to Example 1, and 0.5 g of acetylene black were added, and the resulting mixture was mixed by a stirring bar in a flask for 15 minutes to prepare a slurry-form composition. A negative electrode body was prepared in a manner similar to Example 1 except that the slurry-form composition was used, and battery performance of a lithium ion secondary battery were evaluated.

Comparative Example 1

(Preparation of Silicon Oxide)

Silicon oxide (4) was obtained in a manner similar to Example 1 except that, in preparation of silicon oxide, a calcination temperature in heat treatment was adjusted to 1000° C.

The results of infrared spectrometry and an elemental analysis of silicon oxide (4) obtained are shown in FIG. 1 and Table 1, respectively.

(Preparation of a Negative Electrode Body)

A negative electrode body was prepared in a manner similar to Example 1 except that silicon oxide (4) obtained in preparation of the silicon oxide was used.

(Preparation and Evaluation of a Lithium Ion Secondary Battery)

A lithium ion secondary battery was prepared in a manner similar to Example 1 except that the negative electrode body prepared from silicon oxide compound (4) was used as a negative electrode body, and battery performance was evaluated. The results of evaluation of the battery performance is shown in Table 1.

Comparative Example 2

Silicon oxide (5) was obtained in a manner similar to Example 1 except that, in preparation of silicon oxide, a calcination temperature in heat treatment was adjusted to 500° C.

The results of infrared spectrometry and an elemental analysis of silicon oxide (5) obtained are shown in FIG. 1 and Table 1, respectively.

A negative electrode body was prepared in a manner similar to Example 1 except that silicon oxide (5) described above was used, and a lithium ion secondary battery was prepared in a manner similar to Example 1 except that the negative electrode body obtained was used, and battery performance was evaluated. The results of evaluation of the battery performance is shown in Table 1.

Comparative Example 3

As silicon oxide, silicon monoxide powder having a maximum particle size of 32 micrometers was used by classifying commercially available silicon monoxide (made by Sigma-Aldrich Co. LLC., under 325 mesh) by using a stainless steel sieve having an opening of 32 micrometers.

The results of infrared spectrometry and an elemental analysis of the silicon monoxide used are shown in Table 1.

A negative electrode body was prepared in a manner similar to Example 1 except that the silicon monoxide described above was used in place of silicon oxide (1), and a lithium ion secondary battery was prepared in a manner similar to Example 1 except that the negative electrode body obtained was used, and battery performance was evaluated. The results of evaluation of the battery performance is shown in Table 1.

The results of the elemental analysis and the performance of the battery adopting the negative electrode body prepared by using each negative electrode active material in Examples 1 to 5 according to the invention and Comparative Examples 1 to 3 are as shown in Table 1.

TABLE 1

| | Heat treatment temperature | Elemental analysis (mole ratio) | | | Infrared spectrometry (peak ratio) | BET specific surface area | First charging capacity | First discharging capacity | 100th cycle discharging capacity | First charging and discharging efficiency | Capacity maintenance ratio |
|---|---|---|---|---|---|---|---|---|---|---|---|
| | ° C. | Si | O | H | $I_1/I_2$ | m²/g | mAh/g | mAh/g | mAh/g | % | % |
| Example 1 | 800 | 1.00 | 1.50 | 0.08 | 0.08 | 3.6 | 1879 | 1090 | 1010 | 58.0 | 92.7 |
| Example 2 | 800 | 1.00 | 1.51 | 0.09 | 0.07 | 3.7 | 1885 | 1077 | 998 | 57.2 | 92.6 |

TABLE 1-continued

| | Heat treatment temperature | Elemental analysis (mole ratio) | | | Infrared spectrometry (peak ratio) | BET specific surface area | First charging capacity | First discharging capacity | 100th cycle discharging capacity | First charging and discharging efficiency | Capacity maintenance ratio |
|---|---|---|---|---|---|---|---|---|---|---|---|
| | °C. | Si | O | H | $I_1/I_2$ | m²/g | mAh/g | mAh/g | mAh/g | % | % |
| Example 3 | 700 | 1.00 | 1.52 | 0.20 | 0.14 | 5.4 | 1813 | 947 | 883 | 52.2 | 93.3 |
| Example 4 | 800 | 1.00 | 1.51 | 0.10 | 0.08 | 3.5 | 1858 | 1049 | 975 | 56.5 | 92.9 |
| Comparative Example 1 | 1000 | 1.00 | 1.50 | 0.01 | <0.01 | 3.1 | 1869 | 1068 | 767 | 57.2 | 71.8 |
| Comparative Example 2 | 500 | 1.00 | 1.55 | 0.47 | 0.38 | 6.5 | 1634 | 568 | 524 | 34.8 | 92.4 |
| Comparative Example 3 | 800 | 1.00 | 1.05 | 0.05 | 0.04 | 2.4 | 2104 | 1212 | 134 | 57.6 | 11.1 |

According to the results described above, all the batteries using the silicon oxide having a suitable amount of Si—H bonds prepared from the hydrogen silsesquioxane polymer (HPSQ) used in the invention have a higher capacity in both an initial capacity and a 100$^{th}$ discharging capacity, in comparison with the capacity of the battery using the conventional carbon-based negative electrode active material, and also have smaller reduction of the capacity and a higher capacity retention ratio, more specifically, superb cycle performance, and the negative electrode active material according to the invention can be evaluated to be able to withstand practical use as the negative electrode material.

With regard to the performance of the battery adopting the negative electrode using the negative electrode active material prepared from the silicon oxide having a small amount of Si—H bonds as described in Comparative Example 1, or the silicon oxide (in Comparative Example 3) obtained by the method other than the invention, in comparison with the performance of the battery prepared under the conditions identical with the conditions for the negative electrode adopting the negative electrode active material according to the invention, while the first discharging capacity exhibits a predetermined degree of value, the capacity is rapidly reduced, and further reduced in comparison with the capacity of the battery using the carbon-based negative electrode active material, or the like. Accordingly, the negative electrode active material is unable to exhibit the performance as in the conventional battery as the battery performance.

Moreover, with regard to the performance of the battery adopting the negative electrode using the negative electrode active material prepared from the silicon oxide having an excessive amount of Si—H bonds as described in Comparison Example 2, while the cycle performance is satisfactory, the first discharging capacity is significantly low, and the battery is poor in practical use.

INDUSTRIAL APPLICABILITY

A lithium ion secondary battery having an excellent capacity and excellent charging and discharging performance and cycle performance can be obtained by using a negative electrode active material for the lithium ion secondary battery according to the invention to form an negative electrode by using the same, and using the negative electrode in the lithium ion secondary battery. For example, the invention is a technology useful in a field of batteries, and particularly in the field of secondary batteries.

What is claimed is:

1. A negative electrode active material for a lithium ion secondary battery, comprising silicon oxide that is obtained by heat-treating at a temperature of 600° C. to 900° C., under an inert gas atmosphere, a hydrogen silsesquioxane polymer obtained by allowing hydrolysis of a silicon compound represented by formula (1) and a condensation reaction of the resulting material, and separating and removing a liquid portion;

wherein the silicon oxide contains silicon, oxygen and hydrogen, and has, in a spectrum measured by infrared spectroscopy, a ratio in a range of 0.01 to 0.35 with regard to intensity of peak 1 at 820 to 920 cm$^{-1}$ due to a Si—H bond to intensity of peak 2 at 1000 to 1200 cm$^{-1}$ due to a Si—O—Si bond, and is represented by a general formula $SiO_xH_y$, wherein $1<x<1.8$, $0.01<y<0.4$:

$$HSi(R)_3 \qquad (1)$$

wherein, R is groups that are identical with or different from each other, and selected from halogen, hydrogen, substituted or unsubstituted alkoxy having 1 to 10 carbons, substituted or unsubstituted aryloxy having 6 to 20 carbons, and substituted or unsubstituted arylalkoxy having 7 to 30 carbons, in which, in the substituted or unsubstituted alkoxy having 1 to 10 carbons, the substituted or unsubstituted aryloxy having 6 to 20 carbons, and the substituted or unsubstituted arylalkoxy having 7 to 30 carbons, arbitrary hydrogen may be replaced by halogen, and wherein the silicon oxide forms primary particles being spherical particles, and the primary particles are further aggregated to form a secondary aggregate having a specific surface area of 3 to 8 m²/g.

2. The negative electrode active material for the lithium ion secondary battery according to claim 1, wherein the silicon compound is trihalogenated silane or trialkoxysilane.

3. The negative electrode active material for the lithium ion secondary battery according to claim 1, wherein a temperature upon heat-treating the hydrogen silsesquioxane polymer under the inert gas atmosphere is 650° C. to 850° C.

4. A method for producing a negative electrode active material for a lithium ion secondary battery, wherein the negative electrode active material comprises silicon oxide that is obtained by heat-treating at a temperature of 600° C. to 900° C., under an inert gas atmosphere, a hydrogen silsesquioxane polymer obtained by allowing hydrolysis of a silicon compound represented by formula (1), and a condensation reaction of the resulting material, and separating and removing a liquid portion;

wherein the silicon oxide contains silicon, oxygen and hydrogen, and has, in a spectrum measured by infrared spectroscopy, a ratio in a range of 0.01 to 0.35 with regard to intensity of peak 1 at 820 to 920 cm$^{-1}$ due to a Si—H bond to intensity of peak 2 at 1000 to 1200 cm$^{-1}$ due to a Si—O—Si bond, and is represented by a general formula SiO$_x$H$_y$, wherein 1<x<1.8, 0.01<y<0.4:

$$HSi(R)_3 \quad (1)$$

wherein, R is groups that are identical with or different from each other, and selected from halogen, hydrogen, substituted or unsubstituted alkoxy having 1 to 10 carbons, substituted or unsubstituted aryloxy having 6 to 20 carbons, and substituted or unsubstituted arylalkoxy having 7 to 30 carbons, in which, in the substituted or unsubstituted alkoxy having 1 to 10 carbons, the substituted or unsubstituted aryloxy having 6 to 20 carbons, and the substituted or unsubstituted arylalkoxy having 7 to 30 carbons, arbitrary hydrogen may be replaced by halogen, and wherein the silicon oxide forms primary particles being spherical particles, and the primary particles are further aggregated to form a secondary aggregate having a specific surface area of 3 to 8 m$^2$/g.

5. The method for producing the negative electrode active material for the lithium ion secondary battery according to claim 4, wherein the silicon compound is trihalogenated silane or trialkoxysilane.

6. The method for producing the negative electrode active material for the lithium ion secondary battery according to claim 4, wherein a temperature upon heat-treating the hydrogen silsesquioxane polymer under the inert gas atmosphere is 650° C. to 850° C.

* * * * *